Feb. 1, 1949.　　　　D. H. WAARA　　　　2,460,722

FASTENER

Filed July 17, 1946.

INVENTOR.
DAVID H. WAARA
BY
ATTORNEY

Patented Feb. 1, 1949

2,460,722

UNITED STATES PATENT OFFICE 2,460,722

FASTENER

David H. Waara, Detroit, Mich., assignor to Robert L. Brown, Ferndale, Mich.

Application July 17, 1946, Serial No. 684,226

2 Claims. (Cl. 24—73)

This invention relates to a fastener and more particularly to a stamped sheet metal fastener for insertion in an opening for securing finishing objects to supporting surfaces which are readily accessible from one side only.

A primary object of the invention is to provide a positive locking, fastening device, which is designed to secure a molding or other decorative part to a supporting member through an aperture in the supporting member.

Another object of the invention is to form upturned edges on the fastener to securely hold the molding to the fastener by a snap-on action.

A further object of the invention is to provide a stationary arm struck from the fastener which is so positioned as to be inserted through an aperture in a supporting member and by lateral movement of the fastener the arm is brought into holding engagement with the underside of the supporting member.

A still further object of the invention is to provide a second arm struck from the fastener that can be bent into the locking position after the fastener has been inserted through an aperture in a supporting member and engage the underside of supporting member at a point opposite to the first mentioned arm thereby securely locking the arms into holding engagement with the underside of the supporting member.

Other objects and advantages of the invention will more fully appear from the following description taken in connection with the accompanying drawings, in which.

Figure 1:
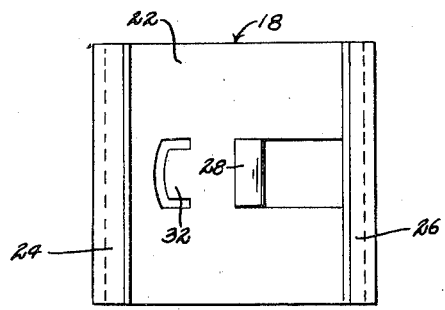
Fig. 1 illustrates a top plan view of the improved molding fastener.
Figure 2:
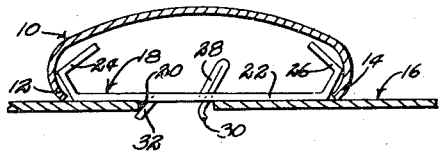
Fig. 2 illustrates the improved fastener with locking arms inserted through an aperture in a supporting member, the arms being shown in the unlocked position, and the fastener being shown in side elevation with the supporting member and the molding in section.
Figure 3:
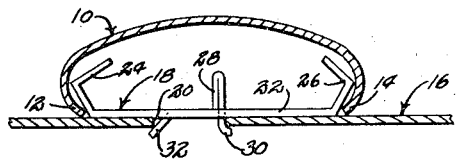
Fig. 3 is a view corresponding to Fig. 2 but showing the locking arms in locked position.

Referring to the drawings, 10 represents a hollow molding or other decorative ornament provided with the usual spaced inwardly turned flanges 12 and 14 which is to be mounted on an apertured support 16. Preparatory to the assembly of the molding to the supporting surface, preformed fasteners 18 are inserted in the apertures 20 of the supporting member 16. Each fastener is provided with a locking means that is bent into the locked position after the fastener 18 has been inserted through the aperture 20 of the supporting member 16, thereby holding the fastener securely in position. The molding 10 is now pressed over the fastener 18 until it snaps into place, the fastener 18 holding the molding 10 firmly in the desired position.

The fastener 18 is preferably made of malleable metal, such as cold roll steel, as distinguished from spring steel and comprises a base 22 having two of its opposite outer edges upturned forming V-shaped projections 24 and 26 over which the spaced inwardly turned flanges 12 and 14 of the molding 10 are pressed until they snap into the locked position.

The middle portion of the base 22 of the fastener 18, from the center of the base 22 to the juncture of the base 22 and the upturned edge 26 is struck upwardly at an acute angle relative to the base, to form an arm 28. A portion of its length, arm 28, is bent reversely downward, upon itself parallel to and pressed against the upwardly bent portion and extending past the base 22 of the fastener 18. A hooked portion 30 is provided at its lower end for frictional engagement with the under side of the supporting member 16. The arm 28 is formed at such an angle to permit the hooked portion 30 to be inserted through the aperture 20 of the supporting member 16.

From the middle portion of the opposite side of the base 22 of the fastener 18 from that which the arm 28 is formed a second arm 32 which is struck downwardly for engagement with the edge of the aperture 20 and the underside of the supporting member 16 opposite the hook 30 to form a positive locking means for cooperation with hook 30.

In the assembly of the device, the arms 28 and 32 of the fasteners 18 are inserted through the apertures 20 of the supporting member 16. The arms 32 engage the edges of the apertures 20 and the underside of the supporting member 16, the undersides of the bases 22 of the fasteners 18 resting against the upper surface of the supporting member 16. The arm 28 is then bent perpendicular to the base 22 of the fastener 18, moving the hook 30 into engagement with the edge of the aperture 20 and the underside of the supporting member 16 opposite that of the arm 32 and forming a positive locking means in cooperation with the arm 32. The hollow molding 10 is then pressed over the fastener 18, the spaced inwardly turned flanges 12 and 14 of the molding 10 snap over the V-shaped projections 24 and 26 of the fastener, holding the molding 10 firmly in position in relation to the supporting member 16.

The device has been illustrated in a preferred form of the invention but it will be understood that various changes including the size, shape and arrangement of parts may be made without departing from the spirit of my invention and it is not my intention to limit its scope other than by the terms of the appended claims.

I claim:

1. A malleable fastening device comprising a base portion providing a snap locking means for receiving a hollow molding or trim strip, having an integral arm struck upwardly therefrom and extending upwardly and outwardly toward one end of said base portion, a portion of said arm being bent reversely downwardly upon itself, the downward portion of said arm lying parallel to, and pressing against said upwardly extending portion of said arm, said downwardly bent portion of said arm extending beyond the opposite side of said base of said fastener and toward the other end of said base portion for insertion into an aperture in a supporting member, said downwardly extending portion of said arm having a portion bent outwardly at its free end toward the first mentioned end of said base portion, a second arm struck downwardly and outwardly toward the said other end of said base portion to engage a lower edge of the said aperture in the supporting member, whereby upon insertion of said downwardly extending arm portions in said aperture and engagement of said second arm with a first lower edge thereof said first arm may be bent to engage its outwardly bent end portion with an edge of said aperture opposed to said first lower edge.

2. A malleable sheet metal fastening device comprising a base, a downwardly and outwardly extending stationary arm depending from said base, a second arm extending above and below said base, said second arm being joined to said base by malleable means intermediate the ends of said arm whereby it is adapted to be bent to project its lower portion in a direction opposite to the direction of said first named arm to form a positive locking means.

DAVID H. WAARA.

REFERENCES CITED

The following references are of record in the file of this patent:

UNITED STATES PATENTS

| Number | Name | Date |
|---|---|---|
| 1,860,250 | Kellogg | May 24, 1932 |
| 2,137,542 | Murphy | Nov. 22, 1938 |
| 2,166,916 | Lombard | July 18, 1939 |
| 2,168,721 | Tinnerman | Aug. 8, 1939 |
| 2,302,585 | Stamy | Nov. 17, 1942 |
| 2,315,211 | Kost | Mar. 30, 1943 |

FOREIGN PATENTS

| Number | Country | Date |
|---|---|---|
| 472,532 | Great Britain | Sept. 24, 1937 |